Dec. 25, 1962  J. P. LINDSEY ET AL  3,070,777
GHOST ELIMINATION
Filed Jan. 2, 1959  4 Sheets-Sheet 1

INVENTORS
R.G. PIETY
J.P. LINDSEY
BY
Hudson + Young
ATTORNEYS

INVENTOR.
R.G. PIETY
J.P. LINDSEY
BY Hudson & Young
ATTORNEYS

United States Patent Office 3,070,777
Patented Dec. 25, 1962

3,070,777
GHOST ELIMINATION
Joe P. Lindsey and Raymond G. Piety, Bartlesville, Okla., assignors to Phillips Petroleum Company, a corporation of Delaware
Filed Jan. 2, 1959, Ser. No. 784,799
6 Claims. (Cl. 340—15.5)

This invention relates to apparatus for removing ghost signals from seismic traces.

When an explosive charge is fired in the earth below a velocity discontinuity, i.e., in a shot hole, the downward moving wave front will contain both incident energy directly from the shot and reflected energy from the interface at the surface or other velocity discontinuity lying above the shot point. In seismic exploration, such an interface always exists above the shot point in the form of the weathered layer or the surface. The effect on a recorded seismic trace is to first record the genuine signal which is traveling directly from the shot, and secondly to record the ghost signal which is reflected from the surface or other velocity discontinuity. The first recorded signal will hereinafter be referred to as the "primary wave front" and the second recorded signal (the one reflected from the surface) will be referred to as the "ghost wave front." The ghost is always delayed by twice the uphole time from the shot point to the velocity discontinuity or the surface as the case may be.

In some geographical areas such as west Kansas and Harris County, Texas, these ghost signals may have a noticeable effect on the recorded seismic trace. It has been found that they are poled oppositely to the primary signal if a displacement type seismic detector is used. However, the ghost is poled in the same direction if a pressure type of seismic detector is used. For the purposes of explaining this invention it will be assumed that the displacement detector has been used in obtaining the seismic trace.

The instant invention proposes to eliminate the ghost signal from a seismic trace by obtaining the primary signal, poling it oppositely to the ghost signal, delaying the primary by the appropriate amount (twice the uphole time from the shot as mentioned above) and summing the primary thus poled with the ghost. The sum will cancel out the ghost signal. Specifically it is proposed to rerecord the seismic trace by passing it through a phase reversing amplifier, delaying the reversed signal by recording it on a magnetic tape, then removing the signal from the tape after desired amount of delay and adding it in a summing circuit to the incoming ghost signal.

As a refinement to this, it is also proposed to operate a gain control which varies the amplitude of the oppositely poled primary signal with respect to time, thereby to eliminate errors due to attenuation of the original signal with respect to time. The gain control is operated responsive to a recording of a programmed gain which recording is taken at the time the original seismic record is made. In order to accomplish this a function generator is employed at the time of obtaining the original seismic record to establish an electrical signal of a relatively high frequency which varies in amplitude in accordance with the desired manner by which the gain of the amplifier is to be varied. This signal is added to the seismic signal to be recorded, and the combined signals are amplified. The amplified signal is applied through a low pass filter to a recorder so that the recorded signal is representative of only the output signal of the seismometer. The output signal of the amplifier is also passed through a second filter which transmits frequencies corresponding to the frequency of the gain control signal. The output of the second filter is compared with a reference potential, and any difference therebetween is applied through a servo system to control the gain of the amplifier. In this manner, the gain of the amplifier can be regulated in any selected manner as a function of time.

Figure 1:
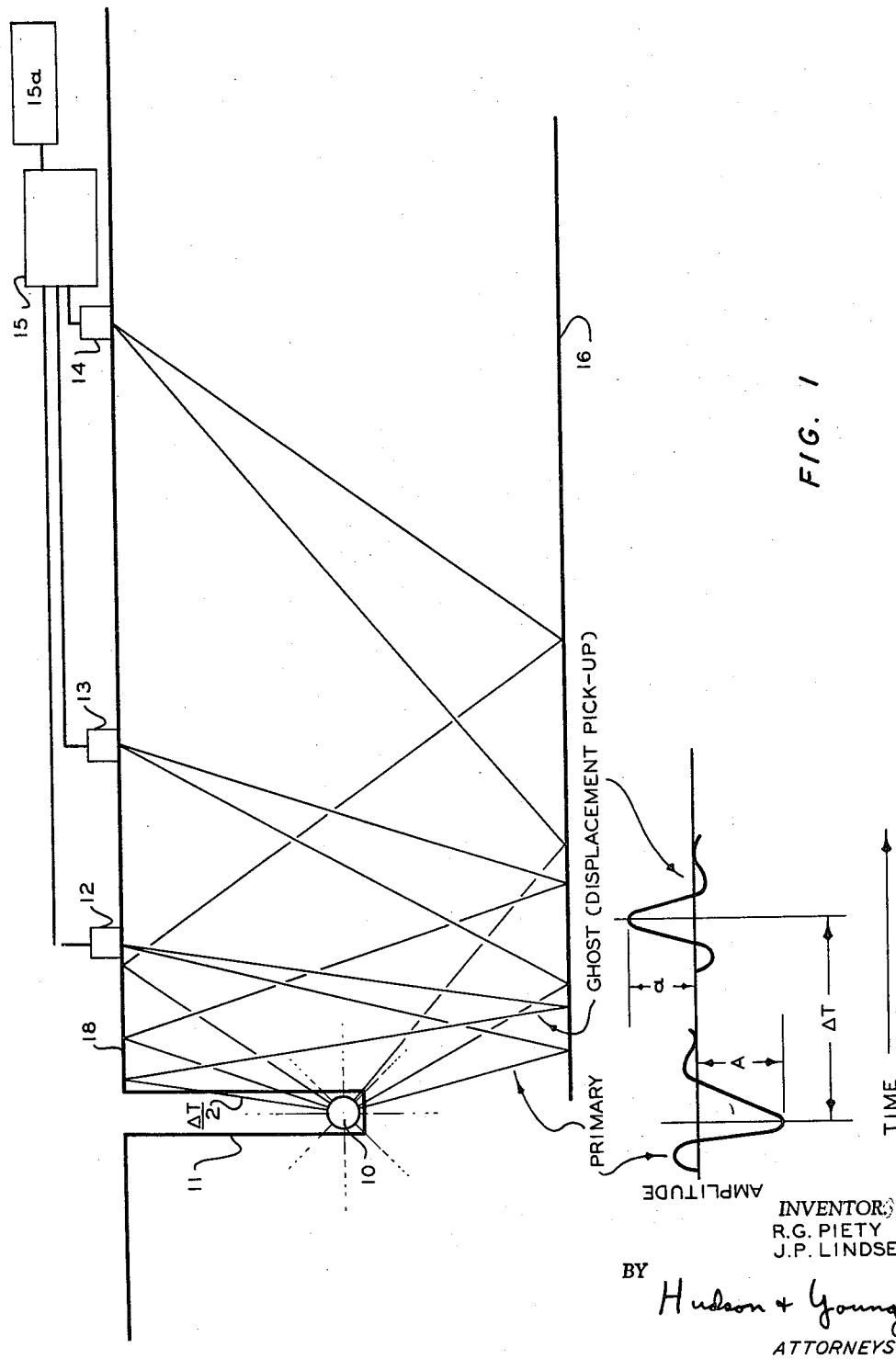
FIGURE 1 shows schematically the taking of a seismic trace in the field wherein a ghost image appears.

In FIGURE 1 a seismic charge 10 is detonated in a shot hole 11, and the seismic traces are picked up by seismometers 12, 13 and 14 which are arranged in a predetermined spaced relationship. The signals picked up by the seismometers are transmitted to a recording apparatus 15, preferably a magnetic recording device. A programmed gain control apparatus 15a may optionally be associated with the latter. The primary signal is first reflected from a velocity discontinuity such as 16. The ghost signal is first reflected from the surface 18 and is delayed by $\Delta T$, twice the uphole time. This is shown graphically at the left side of the drawing, where the reflected traces are illustrated as the characteristic Ricker wavelets.

Figure 2:
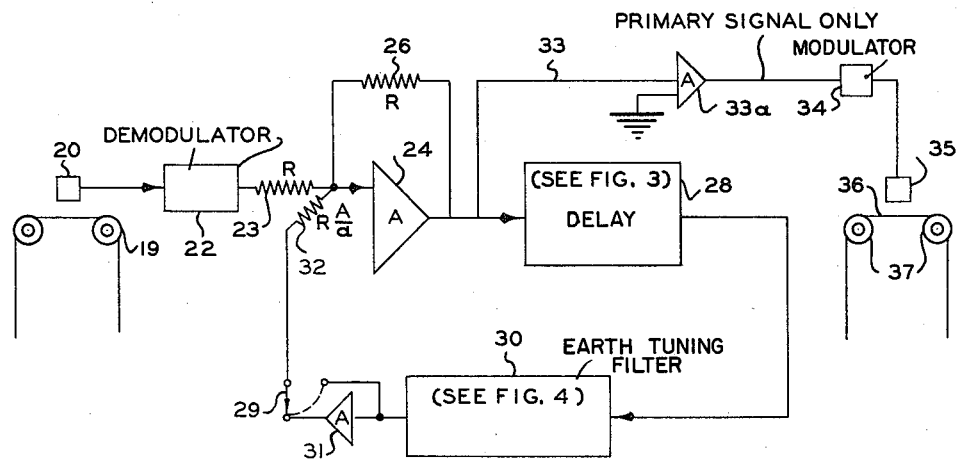
FIGURE 2 is a schematic drawing of the ghost elimination apparatus.

In FIGURE 2 the recorded seismic signal, on tape 19 is played back and one trace at a time is corrected for the ghost signal. If plural devices were employed, plural traces could be simultaneously corrected. The single trace is preferred because it requires a simpler circuit. A pickup 20 detects the magnetic signals recorded on tape 19 and transmits them through a demodulator 22 and a resistor 23 to a mixing amplifier 24. The latter has a feedback circuit comprising a resistor 26 which has a resistance R and is also equal to the resistance of 23. The mixing amplifier is of a phase inverting type, and the output signals therefrom are of opposite polarity from the input signals. The amplifier output is applied to a delay unit 28. In the case of extremely short time delays, an electronic delay line may be preferable. Alternatively, this unit could comprise one channel of the magnetic tape recording and pickup unit 28 as described with respect to FIGURE 3. The delayed signal from 28 is then applied to the earth tuning filter 30 thence to the inverting amplifier 31, selector switch 29, and then to the input of the amplifier 24 through resistor 32. The resistor 32 is sized so that its resistance equals $RA/a$ where A and $a$ represent the primary and ghost signal amplitudes, respectively (see FIGURE 1). This forms an algebraic summing circuit for the input of the amplifier 24 wherein one input is weighted.

The amplifier 31 changes the polarity of the signal across 32 so that the primary and ghost signals will cancel each other when summed at the junction of resistors 23 and 32. The amplifier is used with signals from displacement geophones 12—14, but is switched out by 29 if pressure geophones are used to pick up the signals, as the signals from the latter are originally of the same polarity and only the one inversion in 24 is necessary.

The circuit output appears in a lead 33 and contains only the primary signal. After passing through the phase inverting amplifier 33a, this signal can then be rerecorded in its ghost-free form. Conventional recording apparatus may be connected to the output of 33a and here is shown as a modulator 34, a recording head 35, and a magnetic tape 36 with means 37 for moving the tape past the head to record the signal.

Figure 3:
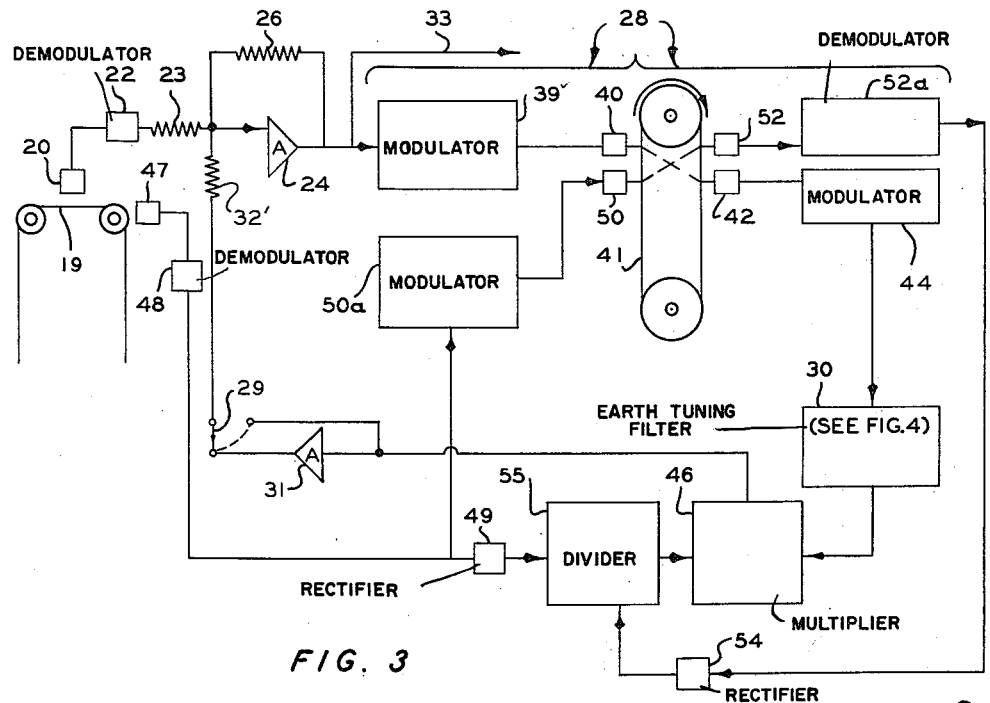
FIGURE 3 is a schematic drawing of the ghost elimination apparatus with gain control.

In FIGURE 3 is shown a ghost elimination apparatus, similar to that of FIGURE 2 and having similar parts denoted by same reference numerals, wherein apparatus is provided to compensate for the change in gain of the seismic signal between the time that the primary signal is recorded and the time the ghost signal is recorded. A primary signal that appears at the output of amplifier 24 passes through the modulator 39 to the recording head 40 where it is recorded on the tape 41. As shown by the crossed dotted lines the pickup or reproducing head 42 applies the signal after an appropriate delay to a demodulator 44, thence to the earth tuning filter 30, the output signal of which is then applied to the multiplier 46 to correct the signal for gain. The corrected signal is then applied across resistor 32′ to the input terminal of the mixing amplifier (or summing amplifier if you will) 24. Here 32′ is the same size as 23.

Gain control signal is obtained from a recording of the gain control obtained as hereinafter explained, by a pickup 47 applying the gain control signal to a demodulator 48, then to a rectifier 49. The output signal from 48 is also applied to a modulator 50a, recording head 50, and to a second channel of the tape 41. A pickup head 52 detects the signal after an appropriate delay and applies it to the demodulator 52a thence to a second rectifier 54 and finally to a first input of a divider 55. The second input of divider 55 actually comprises the signal from 49. In the divider the signal from 49 is divided by the signal from 54. This gives a ratio of the gain at time T to the gain at time $T-\Delta T$. The output from 55 is then applied as a second input signal to the multiplier 46 where the gain of the primary signal is corrected before it is applied to the input of amplifier 24.

A phase reversing operational amplifier such as models K2–W and K2–X, manufactured by George A. Philbrick Researches, Inc., Boston, Mass., and as described in their catalog "Applications Manual for Philbrick Octal Plug-In Computing Amplifiers," copyright 1956 by Philbrick are suitable for use as the amplifier 24. For example, these amplifiers may all be unity again. Of course, if the signal is obtained by a pressure type detector the ghost signal will be poled the same as the primary signal to begin with. In such case there need be no phase reversal provided for by means such as amplifier 31. However, it is still necessary to provide for a delay equal to ΔT and to provide a summing circuit ahead of the amplifier. As previously explained it is assumed for purposes of giving an example that a displacement detector giving signals of the opposite polarity is used to obtain the signals recorded on tape 19. The multiplier 46 and divider 55 may comprise a circuit such as that described in "A Palimpsest on the Electronic Analog Art" (page 8) published in 1955 by the aforesaid Philbrick. The modulators may comprise conventional amplitude modulation (AM) to frequency modulation (FM) apparatus. Similarly, the demodulators were conventional FM to AM devices. These are generally supplied with recording devices of the nature used herein and no invention is claimed in them per se.

Figure 4:
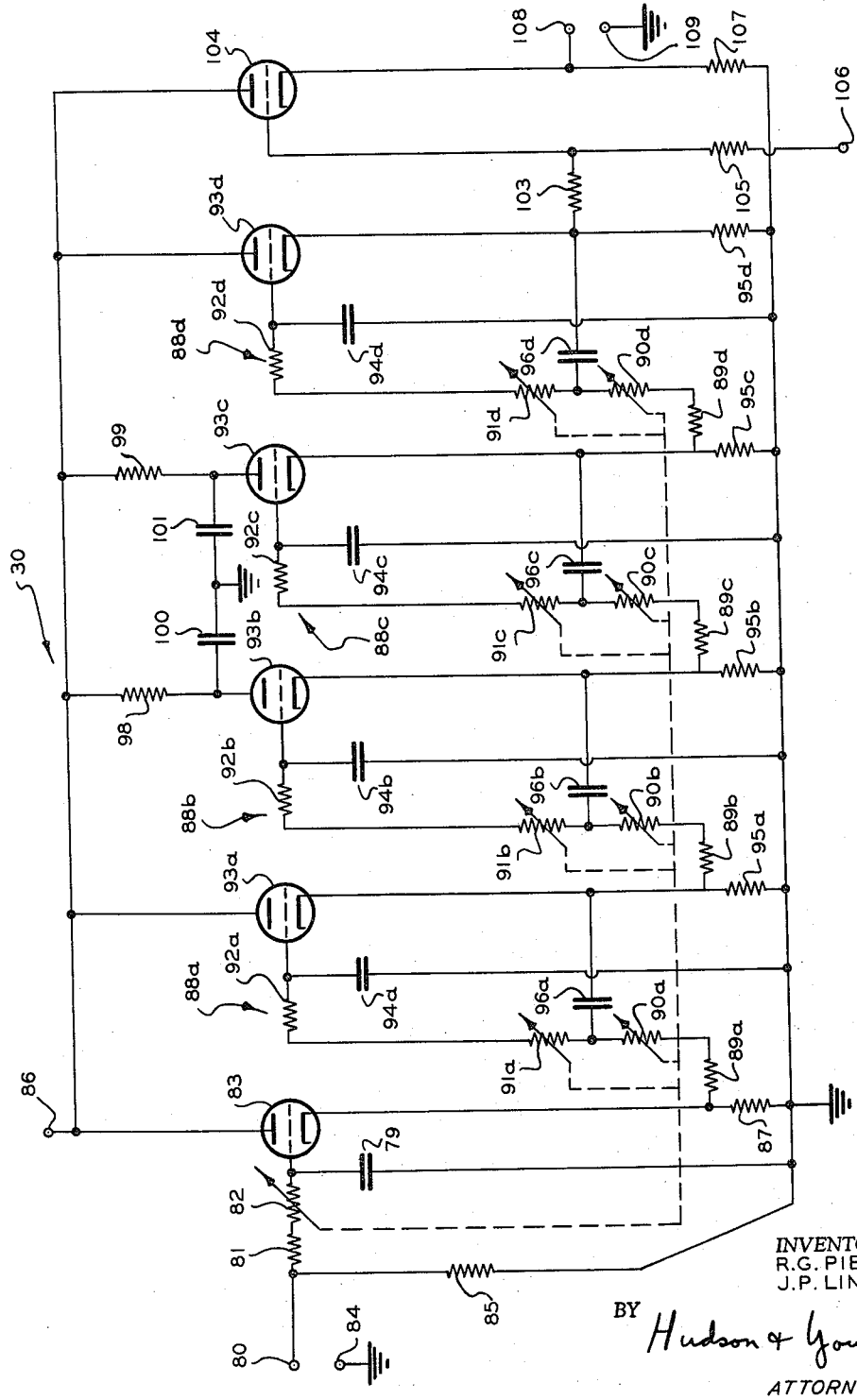
FIGURE 4 shows the details of the earth filter.

In FIGURE 4 there is shown an embodiment of the earth tuning filter of this invention. The first input terminal 80 is connected through a resistor 81 and a variable resistor 82 to the control grid of a triode 83. The second input terminal 84 is connected to ground. Terminal 80 is also connected to ground through a resistor 85. The anode of triode 83 is connected to a post potential terminal 86, and the cathode of triode 83 is connected to ground through a resistor 87.

Four substantially identical filter networks 88a, 88b, 88c and 88d are connected in series relationship with one another to the output of 83. Network 88a comprises a resistor 89a, variable resistors 90a and 91a, and a resistor 92a connected between the cathode of triode 83 and the control grid of a 93a. A capacitor 94a is connected between the control grid of triode 93a and ground. The anode of triode 93a is connected to terminal 86, and the cathode of triode 93a is connected to ground through a resistor 95a. A capacitor 96a is connected between the junction between resistors 90a and 91a and the cathode of triode 93a. Filter networks 88b, 88c and 88d are substantially identical to network 88a. The anodes of triodes 93b and 93c are connected to terminal 86 through resistors 98 and 99, respectively. The anodes of these triodes are also connected to ground through capacitors 100 and 101 respectively.

The cathode of triode 93d is connected through a resistor 103 to the control grid of a triode 104. The anode of triode 104 is connected to terminal 86, and the cathode of triode 104 is connected to ground through a resistor 107. The control grid of triode 104 is connected through a resistor 105 to a negative potental terminal 106. The cathode of triode 104 is connected to a first output terminal 108, the second output terminal 109 being connected to ground.

Variable resistors 82, 90a, 91a, 90b, 91b, 90c, 91c, 90d and 91d are mechanically connected to one another so that all can be increased or decreased in value in unison. In one specific embodiment of this filter, each of these resistors had a total value of 100,000 ohms.

The filter network of FIGURE 4 can readily be tuned by adjustment of the ganged resistors in order to accommodate signals of different configurations. For example, an increase of the values of the ganged resistors results in the response of the network to a single input pulse being broadened with respect to time. A decrease in resistance has the opposite effect. The network is smoothly adjustable. This network is particularly adapted for use in a number of seismic filtering operations because its response to a unit input pulse is quite similar to the filtering characteristics of the earth to a seismic impulse. The adjustment feature permits the network to be "tuned" to different types of earth formations.

Figure 5:
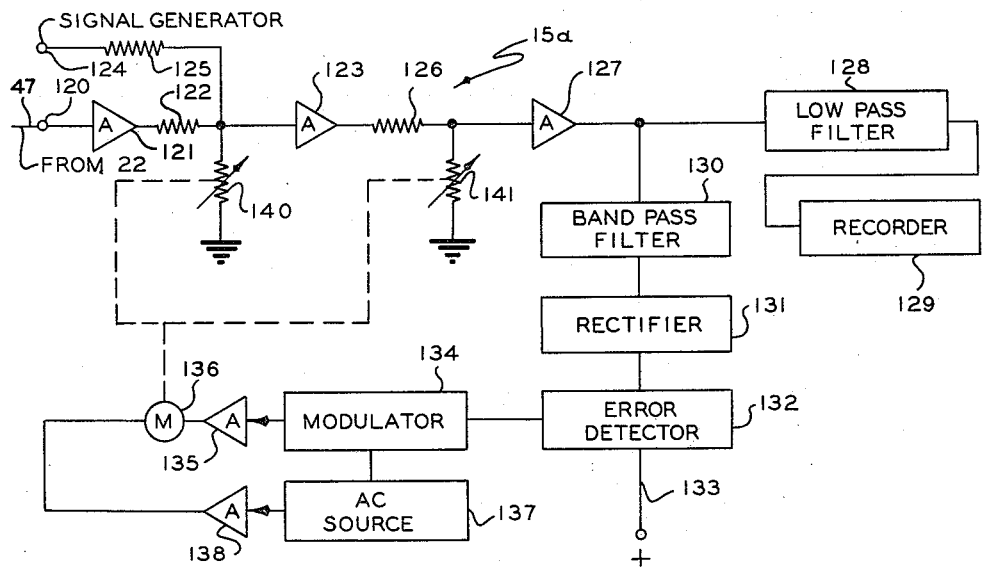
FIGURES 5 and 6 show schematically portions of the gain control apparatus.
Figure 6:
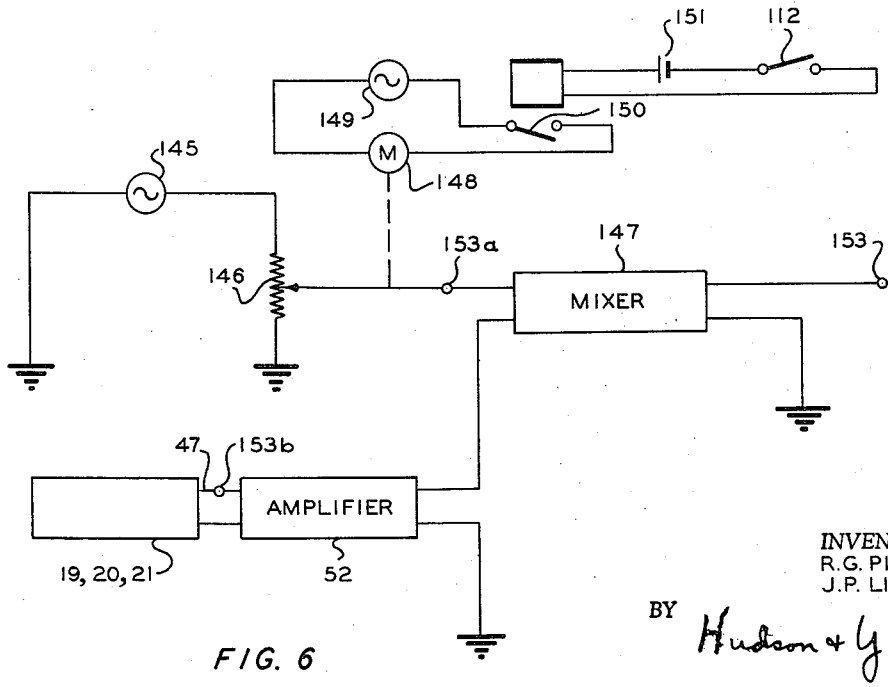

In FIGURES 5 and 6 is shown one manner in which the seismometer gain control system 15a (FIGURE 1) may be operated so that gain correction may be achieved in the apparatus of FIGURE 3. In essence this is a programmed gain control wherein a recording is made of the gain simultaneously with the seismic recording. The details of one such system are shown in U.S. application Serial No. 709,282 filed January 16, 1958.

The gain control 15a for the recording apparatus is illustrated schematically in FIGURE 5. Input terminal 120 represents an output terminal of one of the individual seismometers, 12, 13, 14. This terminal is connected through an amplifier 121 and a resistor 122 to the input of a second amplifier 123. A second input terminal 124 is connected to the input of amplifier 123 through a resistor 125. Terminal 124 represents an output terminal of a signal generator which is described in detail hereinafter. This generator establishes an alternating signal of a relatively high frequency, 1500 cycles per second, for example, the amplitude of which is representative of the desired gain of the amplifying system. The output of amplifier 123 is connected through a resistor 126 to the input of an amplifier 127. The output of amplifier 127 is connected through a low pass filter network 128 to a recorder 129. Filter network 128 is designed to transmit frequencies corresponding to the seismic variations, 100 cycles per second and less, for example. Filter network 128 does not transmit frequencies as high as the frequency of the signal applied to input terminal 124 so that only the amplified seismic signals are recorded.

The output of amplifier 127 is also applied through a band pass filter 130 and a rectifier 131 to the first input of an error detecting circuit 132. Filter 130 is designed to transmit frequencies corresponding to the frequency of the signal applied to terminal 124. A reference potential from a terminal 133 is also applied to error detecting circuit 132. Any difference between the two compared signals establishes an output signal which is applied through a modulator 134 and an amplifier 135 to the first input of a reversible servo motor 136. An alternating signal from a multiphase source 137 is applied to a second input of modulator 134 and through an amplifier 138 to the second input of motor 136. The drive shaft of motor 136 is connected to adjust resistors 140 and 141. Resistor 140 is connected between the input of amplifier 123 and ground, and resistor 141 is connected between the input of amplifier 127 and ground. These two resistors thus determine the gain of the amplifier by adjusting the amount of the input signal which is shunted to ground. Since the servo system responds solely to signals of the frequency of the signal applied to terminal 124, the gain of the amplifier is adjusted solely in response to the amplitude of this signal.

A suitable signal generator for controlling the gain of the amplifier is illustrated schematically in FIGURE 6. The first terminal of an alternating current source 145 is connected to the first terminal of a potentiometer 146. The second terminal of current source 145 and the second end terminal of potentiometer 146 are connected to ground. Current source 145 generates a signal of a relatively high frequency, such as 1500 cycles per second. The contactor of potentiometer 146 is connected to the first input terminal 153a of a mixer circuit 147. The contactor of potentiometer 146 is mechanically connected to the drive shaft of a motor 148 which is connected to a current source 149 through a relay operated switch 150. The coil of the relay is connected to a current source 151 through a switch 112 which is closed when the detonator is actuated. Closure of switch 112 thus energizes motor 148 to move the contactor of potentiometer 146. This potentiometer can be constructed so that the voltage at the contactor, with respect to ground, varies as a function of time in any preselected manner, thereby establishing the desired gain of the amplifier system. The output signal of one of the seismometers, such as 13 (FIGURE 1) is applied through an amplifier 52 which has an input terminal 153b to the second input of mixer 147. The gain control signal and the seismometer signal are thus combined so that the output signal of mixer 147 represents the sum of these two signals. The first output terminal of mixer 147 is connected to a terminal 153 which corresponds to the input terminal of amplifier 123 of FIGURE 5.

In the operation of this apparatus, a set-up similar to that of FIGURE 1 is used to obtain a seismic trace, preferably on magnetic tape such as 19 of FIGURES 2 and 3. When the signal is thus obtained and it becomes apparent that the ghost signal is of major importance it then becomes necessary to process the tape with the apparatus of FIGURE 2 or 3. This signal is detected in its effect either from inspection of the tape, if visual signals such as a photographic recording are used, or when processing a magnetic tape to remove noise or the like, makes the ghost apparent. When this is so, ΔT, the time delay of the ghost, is determined either directly from the tape, or from known conditions of the shot. When ΔT is determined the delay is set on the unit 28 here shown as a magnetic recorder. This is done by spacing the pickup heads from the recording heads by an appropriate amount determined by tape speed. The earth filter 30 is then set in accordance with the known setting determined from previous shots in the same geographical area, the desired time base of the output signal from the filter, by trial and error, or other techniques well known in the art. The system is now adjusted and ready for producing seismic signals free of the ghost. This will first be described with respect to FIGURE 2.

The tape 19 is positioned beneath the pickup head 20 where the signals on the tape are transmitted through resistor 23 to the amplifier 24 (which inverts the signal) and then applied to the delay unit 28. As previously mentioned the delay unit may be a magnetic tape device, or if desired, an electronic delay line filter may be employed. It is preferred to use the magnetic tape. After the signal has been delayed on the unit 28, it is removed therefrom and applied to the earth tuning filter 30 where the signal is shaped appropriately. The signal is then again inverted in 32, then is applied through the summing circuit resistor 32 to the amplifier 24.

The circuit operates in much the same manner when signals from a pressure seismic detector are fed in, except switch 29 by-passes the inverting amplifier 29. Regardless of the species of input signal, the amplifier 24 in both instances has reversed polarity of the signal and the delay unit has delayed the primary signal until such time as the ghost appears. The earth tuning filter 30 shapes the primary so that it effectively cancels the ghost signal. In any event, the delayed signal appears at the amplifier 24 at the same time that the ghost signal appears thereat. The delayed primary there cancels out the ghost signal. The result is the output of the amplifier as sensed in the lead 33 is free of the ghost. In the embodiment shown, this ghost-free seismic trace is then rerecorded on a tape 36.

The ghost eliminating circuit of FIGURE 3 operates in a manner quite similar to that of FIGURE 2 except that one additional step or operation is applied to the opposite polarity delayed primary signal which passes through resistor 32′ into the amplifier 24. This additional process comprises multiplying the delayed primary signal by a factor corrected for the change in gain during recording, e.g., the attenuation through the earth with respect to time. This is carried out in the multiplier 46. The value by which this primary signal is multiplied in 46 is obtained by the operation of the apparatus shown in FIGURES 5, 6 and 7 as explained below.

A recorded gain at the time of the primary signal is passed through the demodulator 48, applied through rectifier 49 to the divider 55, and is also applied through modulator 50a to the tape 41. This is the gain at time T, which is delayed for ΔT. The gain at $T - \Delta T$ is then applied to divider 55 simultaneously with the delayed gain at T, and the ratio of $$\frac{\text{gain at } T}{\text{gain at } T - \Delta T}$$

is computed and applied as the multiplier of the delayed primary (the multiplicand) in 46. The resulting signal is then applied to the summing circuit 23, 32′, where the ghost is cancelled out.

In the apparatus of both FIGURES 2 and 3, it should now be evident that means are provided for providing a primary signal that is poled oppositely to a ghost signal and which is delayed by a proper amount of time so that when added to the ghost signal the delayed primary will cancel out the ghost. This in turn permits the obtaining of a seismic trace which is free of ghost images. In addition a cooperative arrangement has been shown for correcting the delayed primary signal for changes in gain when necessary. In addition means are shown for shaping the signals of both circuits to provide for the effect of the first in so doing. Other advantages and features should also be evident to one skilled in the art.

In both embodiments (FIGURES 2, 3) are shown means for compensating for the differences in amplitudes of the ghost and primary. In FIGURE 2 a "weight average" circuit is shown, while in FIGURE 3 it is necessary to compute a factor to achieve this. In some situations it may be desirable to employ both of these techniques in one apparatus. Also, an adjustable resistor 32 may be used. In some instances it may be desirable to program a change in the resistance of 32 (or 32′), e.g. driving the resistor contactor by a synchronous or a servomotor.

The input to amplifier 24 has been described above as an algebraic summing circuit. This includes circuits for adding and subtracting, such as described in the above-noted "Applications manual . . . ." For example, if a displacement detector is used, thus providing ghost and primary signals of opposite polarity, it would be desired to employ an adding circuit with no overall phase inversion. Alternatively, if the ghost and primary have the same polarity as originally recorded, an adding circuit with one overall phase inversion should be used. Subtracting circuits could be used, in each instance, by changing the overall phase inversion to one for opposite polarity ghost and primary, and changing it to zero for the same polarity of ghost and primary. Desired circuits for these respective purposes are shown in the "manual" in sections 1.2, 1.3, and 2.3. Further, a combined adder-subtractor with means for switching unused terminals to ground such as in said manual at 2.4, may be used.

Although not shown, it is understood that an "erasing head" may be employed in the magnetic tape delay system so that the tape can be cleared of recorded signals after they have been picked up by heads 42, 52.

It is not our intention to limit ourselves to the embodiments which we have illustrated herein, but to include as our invention all those modifications and changes thereto, as well as equivalents of the various portions, which would be obvious to one skilled in the art.

We claim:

1. Apparatus for performing operations on a seismic trace to remove a ghost signal therefrom, comprising means for reproducing a seismic trace; a unity gain phase reversing amplifier having first and second input terminals; means connected to the output of said amplifier for delaying signals by recording them on a recording medium and then establishing a delayed signal a predetermined time thereafter; an earth tuning filter connected to said means for delaying; means for algebraically summing the reproduced seismic traces and delayed signals that have been filtered in said filter further comprising means for connecting the first-said means to said first terminal, means for connecting said filter to said second terminal, and a feedback circuit around said amplifier connected to said first terminal; and means disposed between said filter and said second terminal for changing the amplitude of the delayed signal from said filter by a ratio of the amplitude of a selected primary signal to the amplitude of the ghost signal succeeding it.

2. The apparatus of claim 1 wherein the last-said means includes means for varying the ratio in a predetermined manner with respect to time.

3. Apparatus for eliminating ghost reflections from a received electrical signal comprising a summing means having first and second inputs, means to apply a signal to said first input which is representative of a received signal which contains ghost reflections, a signal delay means, means connecting the output of said summing means to the input of said delay means, signal amplitude adjusting means, means connecting the output of said delay means to said second input through said adjusting means, means responsive to said received signal to establish a first signal representative of the amplitude thereof, means including second delay means responsive to said received signal to establish a second signal representative of the amplitude thereof, means responsive to said first and second signals to establish a third signal representative of the quotient of said first signal divided by said second signal, and means responsive to said third signal to adjust the gain of said adjusting means, the output of said summing means representing the output of said apparatus.

4. Apparatus for eliminating ghost reflections from a received electrical signal comprising a phase reversal summing amplifier having first and second input resistors and a feedback resistor, means applying the received signal to the input of said summing amplifier through said first input resistor, signal delay means, means connecting the output of said summing amplifier to the input of said delay means, a second phase reversal amplifier, means connecting the output of said delay means to the input of said second amplifier, means connecting the output of said second amplifier to the input of said summing amplifier through said second input resistor, and switching means connected in parallel with said second amplifier to permit said second amplifier to be removed selectively from the circuit, the output of said summing means representing the output of said apparatus.

5. The apparatus of claim 3 wherein said summing means includes a phase reversal amplifier.

6. The apparatus of claim 3 wherein said summing means includes a phase reversal amplifier, and wherein said means connecting the output of said delay means to said second input includes a phase reversal means.

References Cited in the file of this patent

UNITED STATES PATENTS

| | | |
|---|---|---|
| 2,310,692 | Hansell | Feb. 9, 1943 |
| 2,438,217 | Johnson | Mar. 23, 1948 |
| 2,634,398 | Piety | Apr. 7, 1953 |
| 2,794,965 | Yost | June 4, 1957 |
| 2,838,742 | McManis | June 10, 1959 |
| 2,916,724 | Peterson | Dec. 8, 1959 |
| 2,956,261 | Grossling | Oct. 11, 1960 |

OTHER REFERENCES

"Electronic Analog Computers," Korn & Korn, McGraw-Hill, 1956, pages 13–16.